United States Patent Office 3,053,673
Patented Sept. 11, 1962

3,053,673
OIL WELL CEMENT COMPOSITIONS
Wayne A. Walker, Duncan, Okla., assignor to Halliburton Company, a corporation of Delaware
No Drawing. Filed Mar. 18, 1960, Ser. No. 15,812
16 Claims. (Cl. 106—90)

This invention relates to cement compositions and more particularly to hydraulic cement compositions of the type used in the oil fields in squeeze cementing and for the purpose of cementing or filling the space in a well between the casing and the surrounding formation.

Cements of this type are usually of the hydraulic setting type and are prepared in the form of a pumpable slurry which is then introduced into the well through the casing or a pipe in the well so that the introduced cement slurry will rise in the space between the casing and the surrounding formation. Such a slurry generally comprises a hydraulic cement and water, and sometimes fine granular solids which are not to be confused with coarse aggregates used in structural concretes. In addition various other materials may also be incorporated in the cement composition to aid in accomplishing any of the following:

(1) Bonds the casing to the formation,
(2) Protects the oil-producing zone,
(3) Acts as a seal against contamination of fresh water zones that may be used for domestic supply,
(4) Protects other formation strata such as coal, potash, etc.,
(5) Helps prevent blow-outs from high pressure gas zones behind the casing,
(6) Protects the casing from excluded corrosive formation waters and lowers electrolytic currents,
(7) Seals off "lost circulation" zones or other troublesome formations in order to drill ahead,
(8) Protects surface and protection strings while drilling additional hole as an uncemented pipe is severely shock-loaded.

In field conditions the cement composition will be subjected to temperature conditions varying from 60° F. or lower in shallow wells to 500° F. and even above in wells of extreme depth. Furthermore pressures of 15,000 p.s.i. may readily prevail under field cementing conditions. As to the time the cement composition should remain fluid it should be sufficient to allow the mixture to be pumped down the casing and up the annular space behind the pipe. An adequate safety factor should also be provided for unavoidable delays which may occur while displacing or mixing the cement slurry. In wells deeper than 6,000 feet 2½ to 3 hours or more are desired. When it is realized that the setting of cement is a chemical reaction and as a general rule for every 16° F. rise in temperature the rate of a chemical reaction doubles, it will be obvious definite steps must be taken to retard the setting of the cement composition.

Various materials have been suggested and furthermore have been widely used as retarders in cement compositions. The most successful retarders of the prior art include certain derivatives of lignin compounds generally referred to as calcium lignosulfonates, carboxymethyl-hydroxyethyl cellulose, and saturated salt water. While these retarders have been successfully used at temperatures of 290° F. and below, they have not been entirely satisfactory for use at temperatures above 290° F.

It is, therefore, a principal object of the present invention to provide a cement composition having extended retarded setting properties. Another object of my invention is to provide a combination of certain lignin compounds with a gluconic compound in critical ratios which combination efficiently retards the setting of cement compositions. A further object of this invention is to provide a cement composition having retarded setting properties containing a minor amount of this critical combination of additives. Other objects and advantages of the present invention will become apparent as the invention is hereinafter more thoroughly described.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Before proceeding with specific examples illustrating my invention, it may be well to indicate in general the nature of the materials required in the process.

THE CEMENT

Any of the wide variety of commercially available hydraulic cements may be used in producing the slurries of this invention. The American Society for Testing Materials has established a classification for Portland cements and of those, classes I, II, and III will usually be found to give best results, together with a special type of cement which is known in the oil fields as "oil well slow set cement." For high temperature use above 230° F. it is advisable to add to the cement composition a material such as silica flour which will give a product having very high strengths at temperatures above 230° F. As to the amount of silica flour that may vary from about 20 to 30 percent based on the weight of the cement.

THE WATER

The water used should have a reasonable degree of purity, although for certain purposes, certain electrolytes may be used in the water for the purposes for which those materials are commonly employed. For example, when operating in cold weather, it is customary many times to add enough sodium chloride to the water so as to lower the freezing point of the slurry.

As to the amount of water used with the cement that may vary from about 4 to 6 gallons per sack of cement.

THE RETARDER

The retarder comprises a mixture of two components, one of which is a lignosulfonic acid salt and the other is selected from the class consisting of gluconic acid, gluconic acid delta lactone, an alkali metal gluconate and an alkaline earth metal gluconate. Suitable lignosulfonic acid salts are those wherein the cation is a metal having a valence of at least one but not more than three. Of the many lignosulfonates which are suitable I prefer, because they are readily avaliable in large qauntities at an economical price, the alkali and alkaline earth metal lignosulfonates. As used herein and in the appended claims the term alkali metal includes the ammonium radical. Two sulfonates which I have used with excellent results in my experiments are available commercially under the trade designations of HR–4 and HR–7. These two products are chemically calcium lignosulfonates. I have also found during the course of my invetigations that more than one sulfonate may be efficiently used in the retarder mixture. As a specific example excellent results were obtained when the retarder mixture comprised equal parts of sodium and ammonium lignosulfonates used in conjunction with gluconic acid delta lactone.

As to the amount of retarder mixture used that should be at least 0.1 percent based on the weight of the cement. The upper limit of the retarder mixture is limited only by the economics involved and for that reason I prefer to use the minimum amount that will produce the desired results. As a general rule the higher the temperature and to a lesser extent the higher the pressure the greater the amount of retarder required.

If desired other materials may be used in my cement compositions such as light weight additives, heavy weight additives, low water loss additives, lost circulation additives. Since the use of these materials in cement compositions is well understood by those skilled in the art, their use will not be discussed further.

For a further discussion of cements and cement additives useful in well operations reference is made to the paper by Phil C. Montgomery and Dwight K. Smith, entitled "Oil Well Cementing Practices and Materials," which is hereby made a part of this application. This particular paper was published in Petroleum Engineering 270, The University of Texas, November 30, 1959.

In order to disclose the nature of the present invention still more clearly, the following illustrative examples will be given. It is to be understood that the invention is not to be limited to the specific conditions or details set forth in these examples except insofar as such limitations are specified in the appended claims.

In all the examples the percent retarder is based on the amount of cement as 100 percent.

*Example 1*

In these experiments varying amounts of the retarder were added to a cement slurry formed by admixing water and cement in the ratio of 4.5 gallons of water per sack of cement. The specific cement used in these tests was the product sold under the trade name of Unaflo. For comparison purposes the admixture was subjected to API 16,000 foot squeeze test conditions wherein the circulating and static temperatures were 271° F. and 320° F. respectively.

| Percent retarder | Percent HR-4 | Percent gluconic acid d-lactone | Percent sodium gluconate | Thickening time hours:min. |
|---|---|---|---|---|
| 0.0 | 0.0 | 0.0 | 0.0 | 0:22 |
| 0.375 | 0.375 | 0.0 | 0.0 | 0:24 |
| 0.3 | 0.0 | 0.3 | 0.0 | 1:18 |
| 0.5 | 0.375 | 0.125 | 0.0 | 5:00 |
| 0.5625 | 0.375 | 0.0 | 0.1875 | 3:35 |
| 0.3 | 0.15 | 0.15 | 0.0 | 1:37 |
| 0.3 | 0.2 | 0.1 | 0.0 | 1:54 |
| 0.3 | 0.227 | 0.075 | 0.0 | 2:13 |
| 0.3 | 0.24 | 0.06 | 0.0 | 1:38 |
| 0.3 | 0.25 | 0.05 | 0.0 | 1:20 |

The foregoing experiments show that the retarder was most effective when used in the ratio of three parts of the calcium lignosulfonate per part of the gluconic acid delta lactone. These data also illustrate the synergistic effect when the two components are employed together.

*Example 2*

In this example various cement compositions were subjected to thickening time tests under various conditions wherein the retarder consisted of three parts of HR-4 per part of the gluconic acid delta lactone.

16,000 FOOT SQUEEZE TEST
° F.
Circulating temp. _____ 271
Static temp. _____ 320

| Percent retarder | Cement | Thickening time |
|---|---|---|
| 0.5 | Unaflo | 3:00+ |
| 0.5 | Texcor | 2:43 |
| 0.6 | Starcor | 3:00+ |

18,000 FOOT CASING TEST
° F.
Circulating temp. _____ 300
Static temp. _____ 350

| Percent retarder | Cement | Thickening time |
|---|---|---|
| 0.8 | Unaflo | 3:00+ |
| 0.8 | Texcor | 2:51 |
| 0.8 | Starcor | 3:00+ |

16,000 FOOT CASING TEST
° F.
Circulating temp. _____ 248
Static temp. _____ 320

| Percent retarder | Cement | Thickening time |
|---|---|---|
| 0.4 | Unaflo | 3:00+ |
| 0.5 | Texcor | 2:58 |
| 0.4 | Starcor | 2:25 |
| 0.5 | do | 3:00+ |

14,000 FOOT SQUEEZE TESTS
° F.
Circulating temp. _____ 242
Static temp. _____ 290

| Percent retarder | Cement | Thickening time |
|---|---|---|
| 0.5 | Unaflo | 3:00+ |
| 0.5 | Texcor | 2:55 |
| 0.4 | Starcor | 3:00+ |

TESTS WITH BASIC DYCKERHOFF-HALLIBURTON CEMENT [1]
° F.
Circulating temp. _____ 206
Static temp. _____ 290

14,000 FOOT SQUEEZE TEST

Percent retarder: Thickening time, hours:minutes
0.4 _____ 0:55
0.8 _____ 3:00+
0.8 _____ 3:00+
0.5 _____ 1:25

14,000 FOOT CASING TEST

Percent retarder:
0.5 _____ 3:00+
0.4 _____ 3:30+
0.3 _____ 3:30+
0.2 _____ 3:28

[1] This cement contains no retarder other than that added in the tests.

POZMIX A 140

Pounds
Pozmix A _____ 74
Hydrated lime _____ 11

| Percent retarder | Percent calcium chloride | Well depth, feet | Thickening time hours: minutes |
|---|---|---|---|
| 0.4 | 2.0 | 16,000 casing | 2:30 |
| 0.4 | 0.0 | 16,000 casing | 3:00+ |
| 0.4 | 2.0 | 14,000 squeeze | 2:08 |
| 1.0 | 2.0 | 18,000 casing | 3:45 |

COMPRESSIVE STRENGTHS—24 HOURS

[320° F. curing temperature]

| Cement | Retarder | | |
|---|---|---|---|
| | 0.5 percent | 0.7 percent | 0.9 percent |
| | P.s.i. | P.s.i. | P.s.i. |
| Texcor | 3,340 | 3,390 | 3,480 |
| Unaflo | 4,000 | 2,890 | 3,070 |
| Starcor | 6,450 | 5,120 | 3,820 |

[290° F. curing temperature]

| Cement | Retarder | |
|---|---|---|
| | 0.3 percent | 0.5 percent |
| | P.s.i. | P.s.i. |
| Texcor | 6,400 | 7,480 |
| Unaflo | 5,660 | 8,600 |
| Starcor | 8,300 | 7,780 |

[260° F. curing temperature]

| | Retarder | |
|---|---|---|
| | 0.5 percent | 0.7 percent |
| Texcor | P.s.i. 6,270 | P.s.i. 6,320 |
| Unaflo | 6,840 | 6,560 |
| Starcor | 6,600 | 5,560 |

[230° F.¹ curing temperature]

| | Retarder | |
|---|---|---|
| | 0.5 percent | 0.7 percent |
| Texcor | 8,430 | 3,890 |
| Unaflo | 12,130 | 9,220 |
| Starcor | 9,820 | 7,670 |

¹ Not set hard in 24 hours—48 hr. values.

[200° F.² curing temperature]

| Cement | Retarder | |
|---|---|---|
| | 0.5 percent | 0.7 percent |
| Texcor | 10,390 | 8,980 |
| Unaflo | 8,400 | 6,910 |
| Starcor | 9,900 | 5,930 |

² Not set in 72 hours—96 hr. values.

Another advantage of compositions prepared according to my invention is the increased slump obtained. As an example using Diacel LWL in a Unaflo cement slurry weighted to 18.5 pounds per gallon, 7 gallons of water was required to provide the necessary viscosity of the slurry and as a consequence 75 pounds of Hi-Dense No. 2 was needed per sack of cement. When my retarder was used in the preferred ratio 5.5 gallons of water appeared to be excessive and the amount of Hi-Dense No. 2 required was reduced to 46 pounds.

Similar results were obtained when HR-7 was substituted for the HR-4 used in the foregoing examples. It was also found that other alkali metal and alkaline earth metal gluconates gave about the same results as sodium gluconate and gluconic acid could be substituted for the lactone with approximate equal results.

Texcor, Starcor, Dyckerhoff-Halliburton, and Pozmix A are trade names of well cements which are available commercially.

It will be appreciated that considerable variation in the total and relative amounts of the different ingredients of the invention is permissible, while retaining the benefits of the invention to a substantial degree. Accordingly, the invention is not limited to the specific examples described by way of illustration, but is intended to include all such variations as would occur to one skilled in the art, within the true spirit and scope of the appended claims.

Having described my invention, I claim:

1. A cement composition consisting essentially of: cement, sufficient water to effect hydraulic setting of the cement and produce a workable plastic mix and from at least about 0.1 percent based on the weight of the cement to an amount just less than that which would prevent the cement composition from setting of a mixture comprising a gluconic compound selected from the class consisting of gluconic acid, gluconic acid delta lactone, an alkali metal gluconate, and an alkaline earth metal gluconate, and a lignosulfonic acid salt wherein the cation of said salt is a metal having a valence of at least one and not more than three, characterized further in that the ratio by weight of said salt to said gluconic compound varies from about one to about five parts of said salt per part of said gluconic compound.

2. The composition of claim 1, wherein the ratio of said lignosulfonic acid salt to said gluconic compound, is about three to one.

3. The composition of claim 1 wherein th cation of said lignosulfonic acid salt is an alkali metal.

4. The composition of claim 1 wherein the cation of said lignosulfonic acid salt is an alkaline earth metal.

5. The composition of claim 1 wherein the cation of said lignosulfonic acid salt is the ammonium radical.

6. The composition of claim 1 wherein the cation of said lignosulfonic acid salt is sodium.

7. The composition of claim 1 wherein the cation of said lignosulfonic acid salt is calcium.

8. The composition of claim 1 characterized in that a mixture of lignosulfonic acid salts is used in conjunction with said gluconic compound wherein the cations of said salts are metals having a valence of at least one and not more than two.

9. A cement retarder consisting essentially of: from about one part to about five parts by weight of a salt of lignosulfonic acid wherein the cation of said salt is a metal having a valence of at least one and not more than three, and about one part by weight of a gluconic compound selected from the group consisting of gluconic acid, gluconic acid delta lactone, alkali metal gluconate, and alkaline earth metal gluconate.

10. A cement retarder consisting essentially of: about three parts by weight of a salt of lignosulfonic acid wherein the cation of said salt is a metal having a valence of at least one and not more than three, and about one part by weight of a material selected from the group consisting of gluconic acid, gluconic acid delta lactone, alkali metal gluconate, and alkaline earth metal gluconate.

11. A cement retarder consisting essentially of: about three parts by weight of calcium lignosulfonate and about one part by weight of gluconic acid delta lactone.

12. A well cementing composition having a retarded set, consisting essentially of: a hydraulic cement, sufficient water to provide a pumpable slurry, at least about 0.1 percent by weight of cement to an amount just less than that which would prevent the cement composition from setting of a mixure of a gluconic compound selected from the group consisting of gluconic acid, gluconic acid delta lactone, an alkali metal gluconate, an alkaline earth metal gluconate, and mixtures thereof, and a salt of lignosulfonic acid wherein the cation of said salt is a metal having a valence of at least one and not more than three, and said salt of lignosulfonic acid being present in an amount from about one to about five parts by weight to about one part by weight of said gluconic compound.

13. A well cementing composition, consisting essentially of: a hydraulic cement, sufficient water to provide a pumpable slurry, from about 0.1 percent to about 1.0 percent by weight of cement of a mixture of a gluconic compound selected from the group consisting of gluconic acid, gluconic acid delta lactone, and alkali metal gluconate, and alkaline earth metal gluconate, and mixtures thereof, and a salt of lignosulfonic acid wherein the cation of said salt is a metal having a valence of at least one and not more than three, and said salt of lignosulfonic acid being present in an amount from about one to about five parts by weight to about one part by weight of said gluconic compound.

14. A method of cementing wells having a relatively high static temperature, comprising the step of: introducing into the well a cement slurry having a retarded set, said slurry consisting essentially of: a hydraulic cement, sufficient water to provide a pumpable slurry, at least about 0.1 percent by weight of cement to an amount just less than that which would prevent the cement composition from setting of a mixture of a gluconic compound selected from the group consisting of gluconic acid, gluconic acid delta lactone, an alkali metal gluconate, an alkaline metal earth gluconate, and mixtures thereof, and a salt of lignosulfonic acid wherein the cation of said salt is a metal having a valence of at least one and not more than three, and said salt of lignosulfonic acid being present in an amount from about one to about five parts by weight to about one part by weight of said gluconic compound.

15. A method of cementing wells having a relatively high static temperature, comprising the step of: introducing into the well, a cement slurry having a retarded set consisting essentially of: a hydraulic cement, sufficient water to provide a pumpable slurry, from about 0.1 percent to about 1.0 percent by weight of cement of a mixture of a gluconic compound selected from the group consisting of gluconic acid, gluconic acid delta lactone, an alkali metal gluconate, an alkaline earth metal gluconate, and mixtures thereof, and a salt of lignosulfonic acid wherein the cation of said salt is a metal having a valence of at least one and not more than three, and said salt of lignosulfonic acid being present in an amount from about one to about five parts by weight to about one part by weight of said gluconic compound.

16. A method of cementing high temperature wells, including the step of: introducing into the well a cement slurry having a retarded set, said slurry comprising: a hydraulic cement, water, at least about 0.1 percent by weight of cement of a cement retarder consisting essentially of a gluconic compound selected from the group consisting of gluconic acid, gluconic acid delta lactone, an alkali metal gluconate, an alkaline earth metal gluconate, and mixtures thereof, and a salt of lignosulfonic acid wherein the cation of said salt is a metal having a valence of at least one and not more than three, and said salt being present in an amount from about one to about five parts by weight to about one part by weight of said gluconic compound.

References Cited in the file of this patent
UNITED STATES PATENTS

| | | |
|---|---|---|
| 2,588,248 | Klein | Mar. 4, 1952 |
| 2,672,424 | Avery | Mar. 16, 1954 |
| 2,705,050 | Davis | Mar. 29, 1955 |
| 2,819,171 | Scripture | Jan. 7, 1958 |
| 2,880,102 | Woodard et al. | Mar. 31, 1959 |

OTHER REFERENCES

Carlson: "Lost-Circulation Materials and Mud Additives," Oil and Gas Journal, pages 64, 66 and 67, Dec. 28, 1950.

Rogers: "Composition and Properties of Oil Well Drilling Fluids," published 1948, Houston, Texas, by Gulf Publishing Co., pages 448–449, 452.

UNITED STATES PATENT OFFICE
CERTIFICATE OF CORRECTION

Patent No. 3,053,673                September 11, 1962

Wayne A. Walker

It is hereby certified that error appears in the above numbered patent requiring correction and that the said Letters Patent should read as corrected below.

Column 2, line 50, for "avaliable in large qauntities" read -- available in large quantities --; line 58, for "invetigations" read -- investigations --; column 5, line 28, for "10,390" read -- 10,380 --; column 6, line 6, for "th" read -- the --.

Signed and sealed this 22nd day of January 1963.

(SEAL)
Attest:

ERNEST W. SWIDER                DAVID L. LADD
Attesting Officer                Commissioner of Patents

UNITED STATES PATENT OFFICE
CERTIFICATE OF CORRECTION

Patent No. 3,053,673                                        September 11, 1962

Wayne A. Walker

It is hereby certified that error appears in the above numbered patent requiring correction and that the said Letters Patent should read as corrected below.

Column 2, line 50, for "avaliable in large qauntities" read -- available in large quantities --; line 58, for "invetigations" read -- investigations --; column 5, line 28, for "10,390" read -- 10,380 --; column 6, line 6, for "th" read -- the --.

Signed and sealed this 22nd day of January 1963.

(SEAL)
Attest:

ERNEST W. SWIDER                                      DAVID L. LADD
Attesting Officer                                          Commissioner of Patents